(12) United States Patent
Bork

(10) Patent No.: US 6,324,477 B1
(45) Date of Patent: Nov. 27, 2001

(54) SYSTEM FOR PROCESSING WELL LOG DATA

(75) Inventor: Jonathan Bork, Katy, TX (US)

(73) Assignee: Apache Corporation, Houston, TX (US)

(*) Notice: Subject to any disclaimer, the term of this patent is extended or adjusted under 35 U.S.C. 154(b) by 0 days.

(21) Appl. No.: 09/516,642

(22) Filed: Mar. 1, 2000

(51) Int. Cl.$^7$ .................................................. G01V 1/28
(52) U.S. Cl. .................................................. 702/17; 702/6
(58) Field of Search .................................... 702/14, 17, 6, 702/11, 7, 8; 367/25, 73, 47

(56) References Cited

U.S. PATENT DOCUMENTS 5,754,493    5/1998    Al-Chalabi .

OTHER PUBLICATIONS

Kallweit, R.S. and Wood, L.C.; The limits of resolution of zero–phase wavelets; Geophysics; Jul. 1982; p. 1035–1046; vol. 47; No. 7.

Widess, M.B.; How Thin Is A Thin Bed?; Geophysics; Dec. 1973; p. 1176–1180; vol. 37; No. 6.

*Primary Examiner*—Donald E. McElheny, Jr.
(74) *Attorney, Agent, or Firm*—E. Eugene Thigpen

(57) ABSTRACT

In a preferred embodiment the invention comprises a method of processing well log data which includes evaluating the said well log data to identify variations in the well log data which are indicative of thin beds of a selected thickness, and reducing the magnitude in the well log data of the identified variations by a magnitude related to the selected thickness.

11 Claims, 5 Drawing Sheets

SYSTEM FOR PROCESSING WELL LOG DATA

BACKGROUND OF THE INVENTION

1. Field of the Invention

The invention is related to processing well log data. More specifically the invention is related to a system for improving the correlation of well log data to seismic data.

2. Background of the Invention

To properly interpret seismic data it is important to establish a correspondence between the seismic data, which is recorded as a function of time, and velocity and density logs, which are recorded as a function of depth. Establishing this correspondence can be difficult, however, and a principal reason for this difficulty is that the velocity and density logs are responsive to variations in the subsurface which the seismic signal is unable to resolve, or to even detect.

Normally if seismic data and well log data are both available from a subsurface region of interest, the well log data are used in conjunction with the seismic data to locate a given bed in two-way travel time in order to map the subsurface. Actual velocity, density or impedance variations through the strata of the earth's subsurface can be determined from velocity and density log data. Forward modeling, based on the measured velocity and/or density logs, creates a synthetic seismic trace which is then compared with measured or recorded surface seismic signals from the region near the wellbore from which the log data were obtained. The process of tying synthetic traces derived from log data to seismic travel time is called calibration.

Velocity logs are used frequently in the geophysical industry to identify key reflection events, extract seismic wavelets, assist in the construction of velocity macro-models and as a source of rock property information for seismic modeling and reservoir characterization. Traditionally, proper matching of velocity and density log depths to seismic trace time is an important element of seismic interpretation, but today practitioners are also frequently called upon to determine the effects, on seismic data, of changes in the velocity and density due to changes in hydrocarbons, porosity or lithology. However, these changes which may occur in the real earth may or may not be resolvable, or even detectable, by the seismic data. Further, velocity and density logs often are very complicated, with many severe oscillations which may inhibit the interpreter's ability to determine what effect, if any, a single oscillation or a series of oscillations on a log will have on the actual seismic data. To make effective use of the correlations of seismic data with the well log data, a proper correlation needs to be established between the depth scale on the log data and the time scale on the seismic data, and a method is needed for determining which variations in the log will have corresponding noticeable changes in the seismic data.

Velocity logs are generated by a downhole tool (sonde) which typically is lowered into a wellbore to a selected depth and as the tool is then raised toward the surface, an acoustic signal is generated at a transmitting location on the logging tool, and detected at one or more receiving locations on the logging tool. Because the distance between the transmitting location and the receiver locations, as well as between the two receiving locations is known, by measuring the differential travel time of the transmitted signal, the velocity of the subsurface interval (either the compressional wave velocity or the shear wave velocity, as the case may be) between the receivers, may be determined. The frequency of the transmitted acoustic signal is typically about 10,000 Hz., and velocity measurements are made at intervals as small as 10 centimeters (3.937 inches).

Similarly, density is measured by a downhole tool (sonde) which emits gamma rays from a source and the returning gamma rays are detected by two gamma ray detectors. Dense formations absorb many gamma rays and return few, while lighter formations absorb fewer gamma rays and return more. If the tool is properly calibrated, a direct measurement of density can be obtained. Density measurements may be made at intervals as small as 10 centimeters.

Acoustic impedance is the product of density and compressional wave velocity, and may be determined from compressional wave velocity log and density log, measurements. Elastic impedance is the product of density and shear wave velocity, and may be determined from shear wave velocity log and density log measurements.

In contrast to well log measurements, a seismic signal is generated by injecting an acoustic signal from the earth's surface, which then travels downwardly into the earth's subsurface. When the seismic signal encounters an interface between two subsurface strata having different impedances, a portion of the acoustic signal is reflected back to the earth's surface, where the reflected energy is detected by a sensor. Because high frequency signals cannot penetrate the earth's subsurface to the depths of interest in many hydrocarbon exploration prospects, the maximum frequency of the detected seismic signal will typically be about 60 Hz, which means the bandwidth of the seismic data is several orders of magnitude less than the bandwidth of the recorded velocity or density log. Accordingly, the bandwidth of the downgoing seismic wavelet does not enable the seismic signal to resolve the very thin beds recorded by the velocity and density logs, and in many cases is scarcely able to even detect these thin beds.

Resolution and detection of the seismic method is discussed in an article by R. S. Kallweit and L. C. Wood, *The limits of resolution of zero-phase wavelets*, July 1982, Geophysics, Vol. 47, No. 7, pp 1035–1046. This article shows that the composite seismic response of a thin bed is partially annihilated by the reflection seismic method. This reduction in the returned reflection signal is due to the summation of two returning wavelets, resulting from reflections from the top and bottom of a single layer, that arrive at virtually the same time but with opposite polarity. For very thin beds, the time delay between the reflection from the top of the layer and the reflection from the bottom of the bed is very small, and the attenuation is nearly complete. As the thickness of the bed increases, however, the reflected signal is only partially attenuated. FIG. 1 shows the amplitude of the thin bed reflection signal normalized to the amplitude of the reflection signal that would be returned from a thick bed reflection interface. This normalized amplitude plot is referred to herein as the "tuning curve". The two-way travel time between the bottom and top of the thin bed layer is plotted across the abscissa of FIG. 1. As the separation between the top and bottom of the layer increases, the attenuation is lessened, until, at a specific separation, there is no reduction in signal amplitude, i.e., the tuning weight is equal to 1 (one). By "tuning weight" is meant maximum weight, at a given separation, of a composite waveform created when a unit amplitude zero-phase wavelet is convolved with a unit amplitude dipole (i.e., +1, −1). As the separation between the layers increases further, the amplitude actually increases until it reaches a maximum amplitude. At the time distance on this "tuning curve" where the maximum amplitude occurs, which is designated in FIG. 1 as "$T_R$", the signal reflections from the top of the layer and from the bottom of the layer become separated, and reflections from the top and bottom of the layer will appear separately in a recorded seismic signal. This time distance, $T_R$, which is referred to herein as the resolution limit, is typically about 10 milliseconds. For a layer 10 feet thick, with a velocity of 10,000 feet per second, the two way travel time is 2 milliseconds, which is well below the resolution limit, $T_R$, therefore, the seismic response of this layer will be greatly reduced. From this illustration, it is clear that the seismic signal may be greatly attenuated, and that the recorded seismic signal will not be able to resolve the signal returned from a layer through which the two way travel time (TWTT) of the seismic signal is less than $T_R$.

In order to aid the practitioner in correlating the velocity and density logs with seismic data, methods have been utilized in the prior art to remove the high frequency portion of these logs. These prior art techniques are based on filtering of the log data. For example, a low pass filter has often been applied to the velocity or density logs. However, this approach removes jumps in the log data and it may introduce artifacts whenever velocity spikes occur on the log. Rather than removing the thin bed spikes, this method merely smooths the log data, so that error is introduced in adjacent locations and important jumps may be eliminated.

In another prior art filtering method, the median filter method, a moving window is applied to the log and the center value within this moving window is replaced with the median value within the window. This method will replace high frequency spikes with reasonable values and has the advantage of preserving jumps in the sonic log. Nevertheless, this technique employs no guiding principles on the correct amount of each spike and/or jump to preserve and, conversely on the correct amount to remove.

There remains a long felt need in the industry for an improved method for processing log data to assist the explorationist in correlating the log data with seismic data. It is an object of this invention to provide such an improved method.

SUMMARY OF THE INVENTION

In a preferred embodiment the invention comprises a method of processing well log data which includes evaluating the said well log data to identify variations in the well log data which are indicative of thin beds of a selected thickness, and reducing the magnitude in the well log data of the identified variations by a magnitude related to the selected thickness.

In another embodiment the invention comprises a method of processing well log data which includes generating a reflection coefficient series from either compressional wave velocity log data, sonic wave velocity data, density log data, acoustic impedance log data or elastic impedance log data and locating in the reflection coefficient series pairs of reflection coefficients of opposite polarity and with the time spacing between the two reflection coefficients which is within the thickness range of a thin bed. For each said pair of reflection coefficients, the magnitude of the reflection coefficient having the smaller magnitude is determined and this smaller magnitude is subtracted from the magnitude of each reflection coefficient of the pair, thereby developing a first modified reflection coefficient series. For each pair of reflection coefficients, the smaller magnitude is then multiplied by a factor which is related to the time spacing in the log data between the pair of reflection coefficients, and the resulting multiplied magnitude is stored in a data storage array at a location corresponding to the locations of the pair of reflection coefficients to develop a second modified coefficient series. The first and second modified reflection coefficient series are then summed and the resulting summed coefficient series are inverted to generate a modified well log data of the type from which said reflection coefficient series was calculated.

BRIEF DESCRIPTION OF THE DRAWINGS

The invention and its advantages will be more easily understood by reference to the following description and the attached drawings in which.

While the invention will be described in connection with its preferred embodiments, it will be understood that the invention is not limited thereto, but shall include all alternatives, modifications, and equivalents within the scope of the appended claims.

DESCRIPTION OF THE PREFERRED EMBODIMENT

Figure 2:
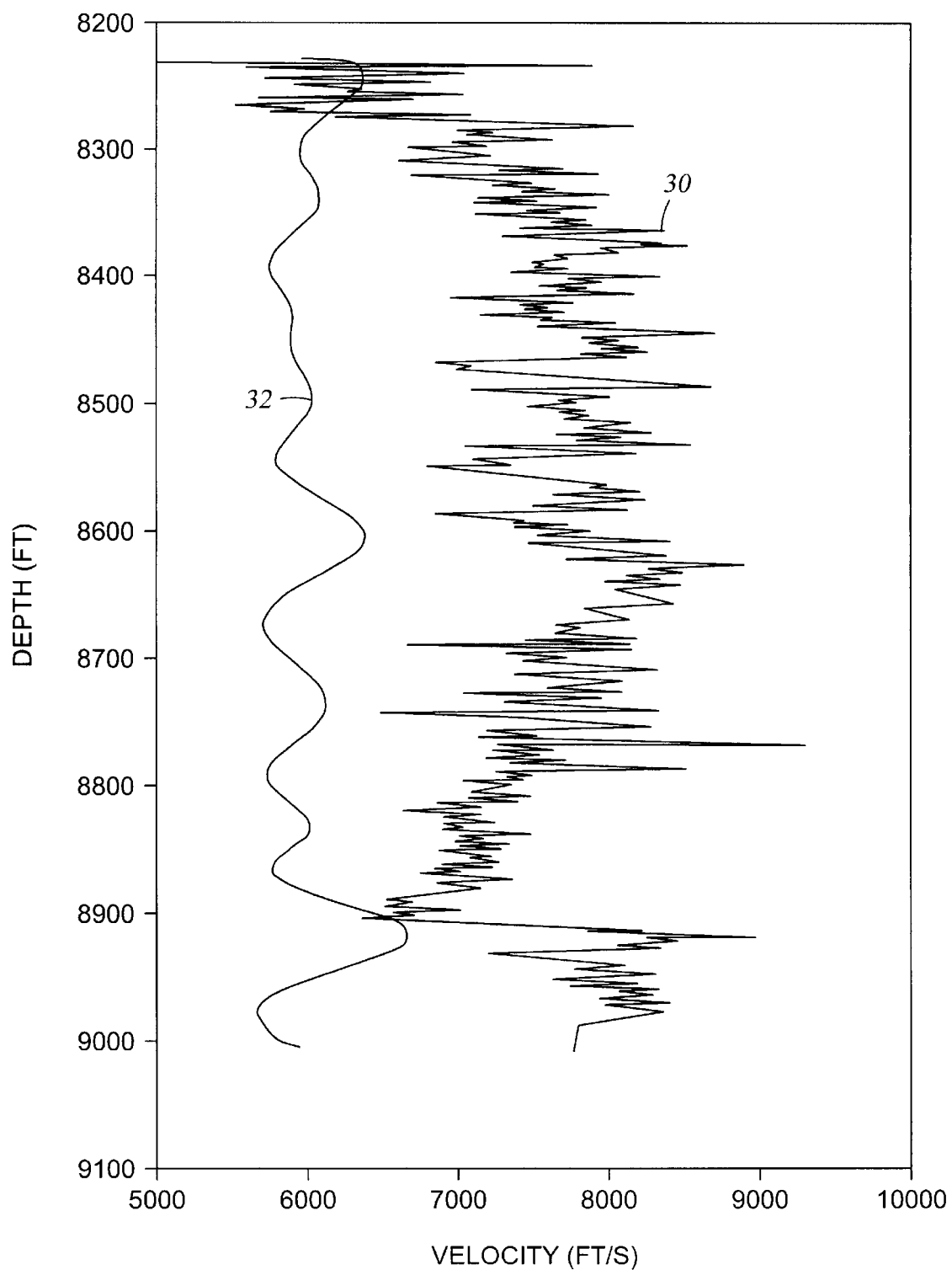
FIG. 2 shows a typical compressional wave velocity well log and a seismic trace for the location of the wellbore in which the compressional wave velocity log was measured.

FIG. 2 shows a typical compressional wave velocity well log designated by numeral 30 recorded at wellbore depths extending from about 8225 feet to 9000 feet. This compressional wave velocity log shows the variations in compressional wave velocity along the length of the wellbore. FIG. 2 also shows a seismic trace designated by numeral 32 generated for the location of the wellbore in which the compressional wave velocity log was measured. Perturbations in the seismic trace represent reflections from subsurface interfaces of a seismic signal generated at the surface. Although the compressional wave velocity and density well logs are recorded as a function of depth and the seismic trace is recorded as a function of time, the well logs and the seismic trace are shown in horizontal alignment so that the perturbations in the seismic trace are substantially aligned with the log variations representing the subsurface variations which produced the seismic signal perturbations. Although not shown in FIG. 2, a shear wave velocity log, a density log, an acoustic impedance log or an elastic impedance log would each exhibit high frequency fluctuations similar to those exhibited by the compressional wave velocity log.

Figure 3:
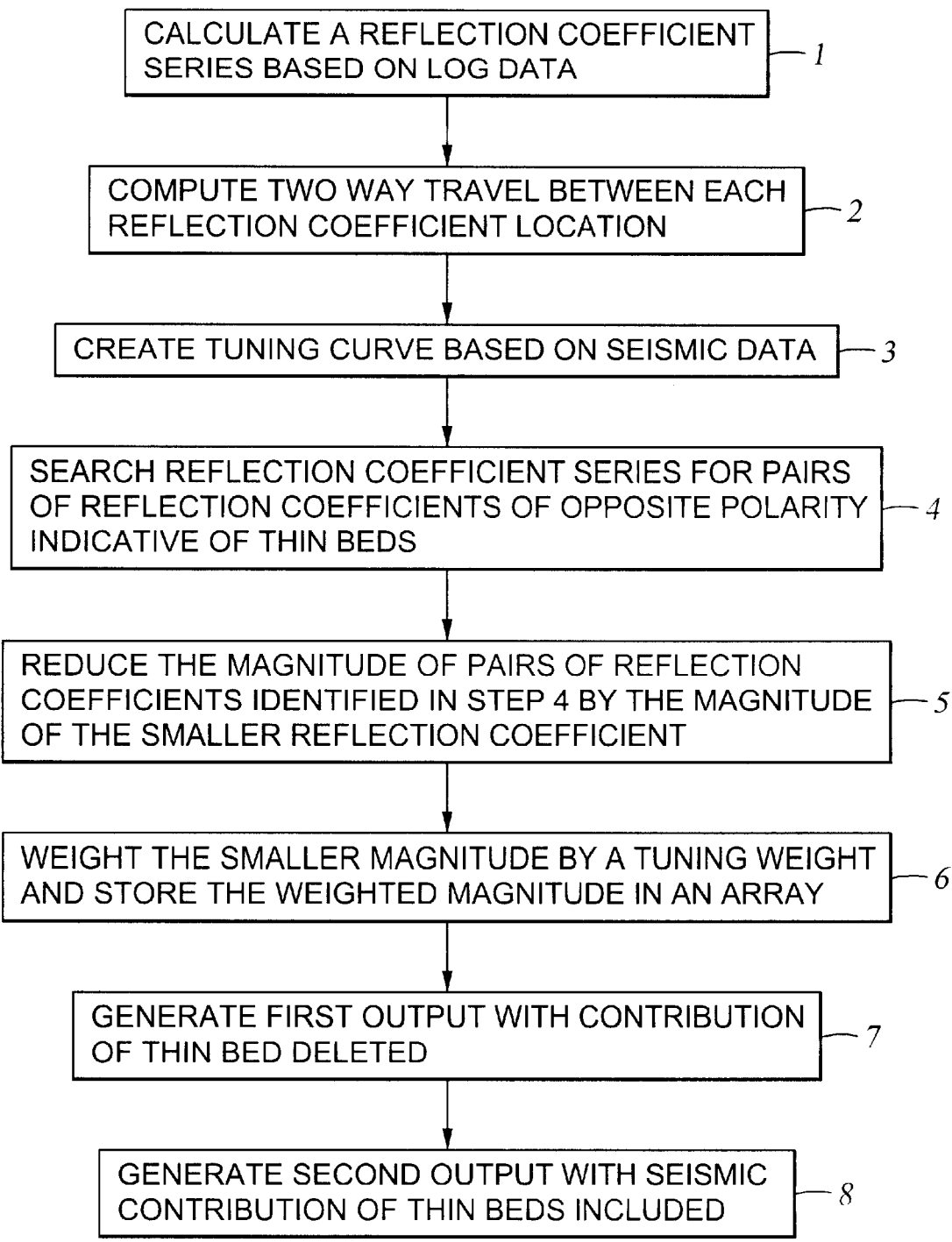
FIG. 3 shows the steps of a particular implementation of the invention.

The steps of a particular implementation of the invention are outlined in FIG. 3. Step 1 is to calculate a reflection coefficient series based on log data. Either the compressional wave velocity data, the shear wave velocity data, the density data, the acoustic impedance data or the elastic impedance data may be utilized for calculating the reflection coefficient series utilized in performing the invention. Either of five computations may be made to develop this reflection coefficient series, depending on whether compressional wave velocity data, the shear wave velocity data, the density data, the acoustic impedance data or the elastic impedance data are utilized.

If compressional wave velocity data or shear wave velocity data are utilized the following equation is utilized for computing the reflection coefficient series:

$$\text{Reflection Coefficient} = \frac{(V_2 - V_1)}{(V_2 + V_1)}. \quad \text{Eq. 1}$$

If density data are utilized the following formula is used:

$$\text{Reflection Coefficient} = \frac{(\rho_2 - \rho_1)}{(\rho_2 + \rho_1)}, \quad \text{Eq. 2}$$

and if acoustic impedance data or elastic impedance data are utilized the following formula is used:

$$\text{Reflection Coefficient} = \frac{(\rho_2 V_2 - \rho_1 V_1)}{(\rho_2 V_2 + \rho_1 V_1)}, \quad \text{Eq. 3}$$

where:

$V_2$=velocity (either compressional wave or shear wave) of the layer below the reflecting interface $V_1$=velocity (either compressional wave or shear wave) of the layer above the reflecting interface $\rho_2$=density of the layer below the reflecting interface $\rho_1$=density of the layer above the reflecting interface.

In each instance, the reflection coefficient is computed for adjacent pairs of log data samples. Reflection coefficients may be computed at the same intervals as the log measurement intervals. Accordingly, for a well in which the log measurement interval is 10 centimeters (3.937 inches), reflection coefficients may also be computed at 10 centimeter intervals. The calculated reflection coefficient series is stored in a first data storage array, in positions corresponding to the locations of the calculated reflection coefficients in the well log. This reflection coefficient series may be referred to herein as the initial reflection coefficient series.

In step 2, the two way travel time of a compressional wave signal or shear wave signal between the location of each adjacent calculated reflection coefficient is computed. If it is desired to correlate the well log data with a compressional wave seismic trace, the compressional wave travel time would be computed. If it is desired to correlate the well log data with a shear wave seismic trace the shear wave travel time would be computed. The distance between the locations of the calculated adjacent reflection coefficients will be known from the log data. The travel time of the compressional or shear wave signal may then be computed from the known distance and velocity data measured in the compressional or shear wave velocity log according to formulae well known to those of ordinary skill in the art. Although the distance between locations of adjacent reflection coefficients will normally be the same throughout the length of the well log, the two way travel time between these locations will vary because of velocity variations along the length of the wellbore.

Figure 1:
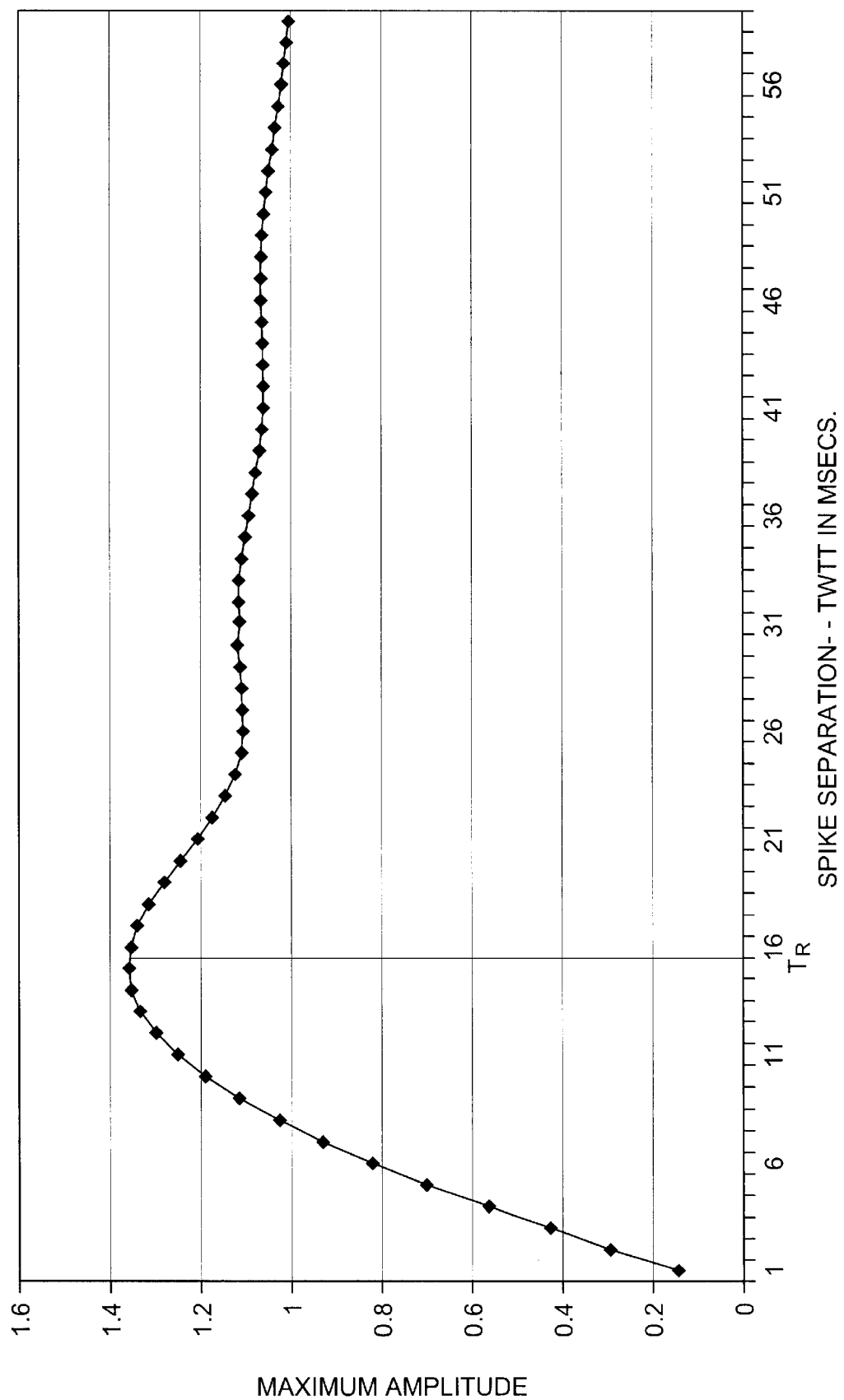
FIG. 1 shows the effect of a thin bed on the amplitude of a reflected seismic signal.

In step 3 a tuning curve for a zero phase wavelet is created, in the form shown in FIG. 1, based on the frequency of the actual seismic data. Each amplitude on this curve represents the maximum amplitude of a composite waveform created when a zero phase wavelet with the same bandwidth as the seismic data is convolved with a +1, −1 spike pair (called a dipole) at a certain time separation. The maximum amplitude of the seismic wavelet is also set to one. By systematically increasing the time separation of the dipole pair and convolving with the normalized wavelet and selecting the maximum amplitude of the composite for each time separation, a tuning curve can be generated for all separations below $T_R$. Note that some separations near $T_R$ actually increase the maximum amplitude to a value greater than one. Because of the selection of a unit dipole as reflection coefficient and a maximum amplitude of one for the wavelet, this tuning curve can be used on any dipole pair regardless of amplitude by merely multiplying the dipole pair by its corresponding value on the tuning curve. As used with reference to this invention, a "thin bed" is a subsurface layer having a time separation between the top and bottom of the layer less than the separation required for reflections from the top and bottom of the layer to appear separately in a seismic record.

In step 4, the reflection coefficient series is searched for thin beds. Reflection coefficient pairs of opposite polarity indicate the presence of a subsurface stratum whose upper and lower boundaries coincide with the locations for which the reflection coefficients were calculated. Accordingly, the reflection coefficients are searched to identify all pairs of reflection coefficients having opposite polarity and a time spacing below resolution, $T_R$, for the seismic data recorded at the wellbore location. Normally all reflection coefficients from adjacent positions in the reflection coefficient series having opposite polarity will have a time spacing below resolution for the seismic data.

In step 5. for each reflection coefficient pairs identified in step 4, the magnitude of the reflection coefficient having the smaller magnitude is determined and this smaller magnitude is subtracted from the magnitude of each of the reflection coefficients of the reflection coefficient pair, so that the magnitude of the smaller of the two reflection coefficients will be reduced to zero. The larger reflection coefficient will have a non-zero residual.

In step 6, the magnitude of the smaller of the two reflection coefficients is then multiplied by a "tuning weight", as determined in step 3, and this weighted magnitude is stored in a second data storage array in locations corresponding to the location in the well log for which the pair of reflection coefficients were initially computed. The "tuning weight" is based on the observation that a thin bed will generate only a single perturbation in a seismic signal. For thin beds which are thinner than the resolution thickness, the detected seismic signal will include a skew-symmetric waveform and the maximum amplitude of this waveform will diminish as the thickness of the bed diminishes. Accordingly, the spike pairs that are stored in the storage location are multiplied by a factor equal to the precise value of the tuning curve corresponding to the two way travel time between the two samples. Since the tuning curve generated in step is created by convolving a zero phase wavelet with a maximum amplitude of one with a unit amplitude dipole pair, the spike pairs can be multiplied from the log by the tuning curve because it has been normalized during its construction.

Steps 4, 5 and 6 are performed sequentially for each pair of adjacent reflection coefficients in the reflection coefficient series. For reflection coefficients whose magnitudes have been attenuated by a computation in step 5, when the reflection coefficient is subsequently paired with another reflection coefficient, the magnitude is maintained at the attenuated level when the step 5 computation is repeated.

After steps 4, 5 and 6 have been performed for each adjacent pair of reflection coefficients, the process of steps 4, 5 and 6 is repeated for pairs of reflection coefficients spaced apart by two reflection coefficient locations. Repetition of the process of steps 4, 5 and 6 continues with the spacing between selected pairs of reflection coefficients being successively incremented by one, until no more pairs of reflection coefficients are found of opposite polarity for which the time spacing between the samples is below the resolution limit, $T_R$, for the seismic signal. The contribution of thin beds has now been deleted from the residual reflection coefficient series remaining in the first data storage array, and the weighted magnitudes stored in the second data storage array have formed an auxiliary reflection coefficient series representing the contribution of the thin beds to a seismic signal generated near the wellbore.

Figure 4:
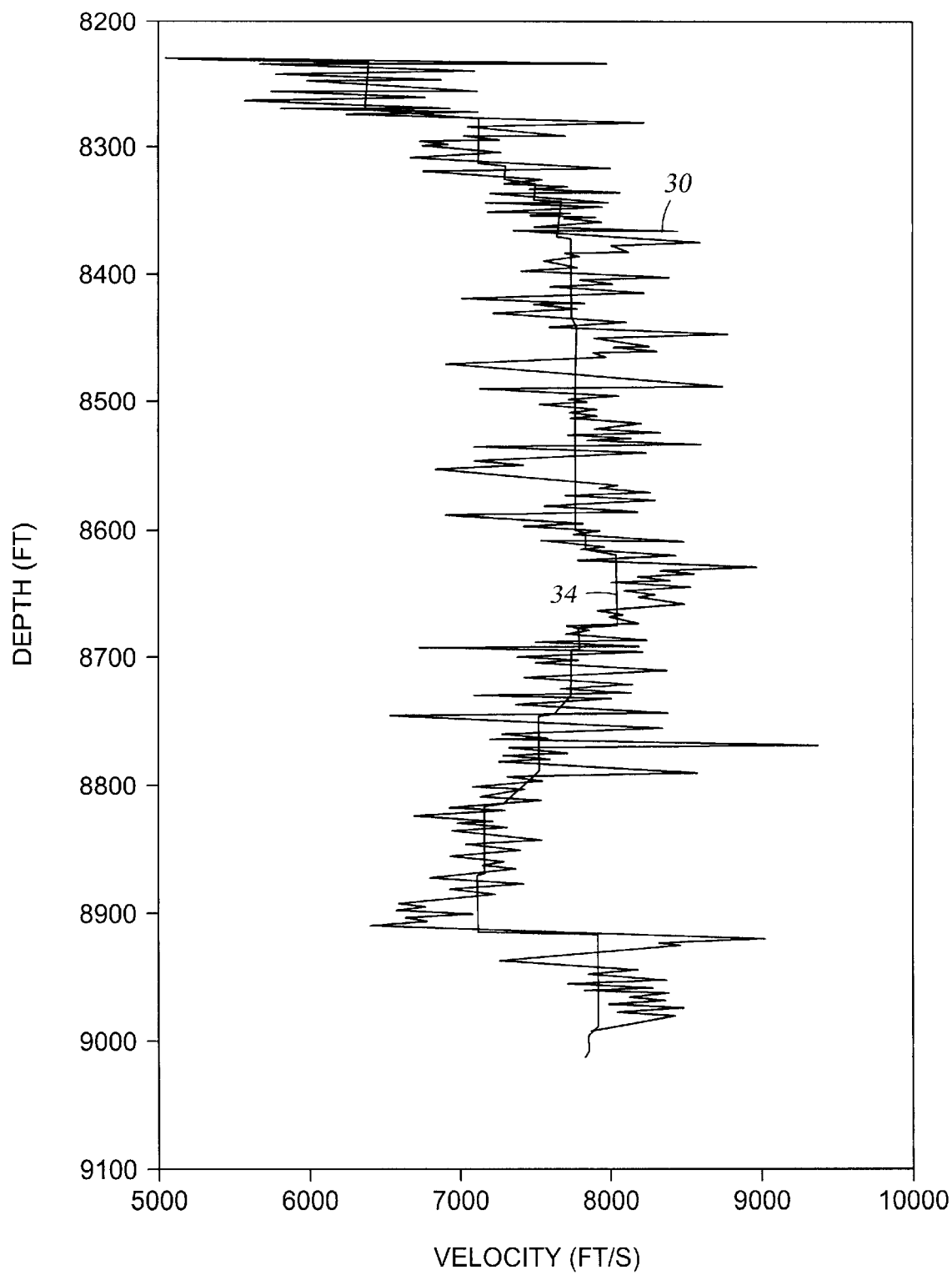
FIG. 4 shows the results of applying the invention to the compressional wave velocity log of FIG. 2.

In step 7, a first output of the invention is generated, in which the residual reflection coefficient series remaining after the attenuations resulting from the repetitions of steps 4, 5 and 6 is reconverted to a first modified log, from which the contribution of the thin beds to the log have been deleted. FIG. 4, which shows the results, designated by numeral 34, of applying the invention to the compressional wave velocity log shown in FIG. 2, represents this first output. Note the limited number of velocity jumps, in comparison to the velocity log ol FIG. 2. The original velocity log, designated by numeral 30 is overlain in FIG. 4 for comparison.

In step 8, a second output of the invention is generated, in which the weighted auxiliary reflection coefficient series stored in the second data storage array is added to the residual reflection coefficient series, and this summed reflection coefficient series is reconverted to a second modified log, the presence of the thin beds, as they would appear to a seismic signal can now be seen in this second modified log. Many of the thin beds are effectively removed. Some of the thicker beds are merely reduced in importance but are still observable, but now the relative importance of the layering (to a seismic signal) is put on an equal basis.

An alternative method of performing step 8 is to regenerate an auxiliary log from the weighted auxiliary reflection coefficient series stored in the second data storage array, and then sum this auxiliary log with the first modified log generated in step 7.

Figure 5:
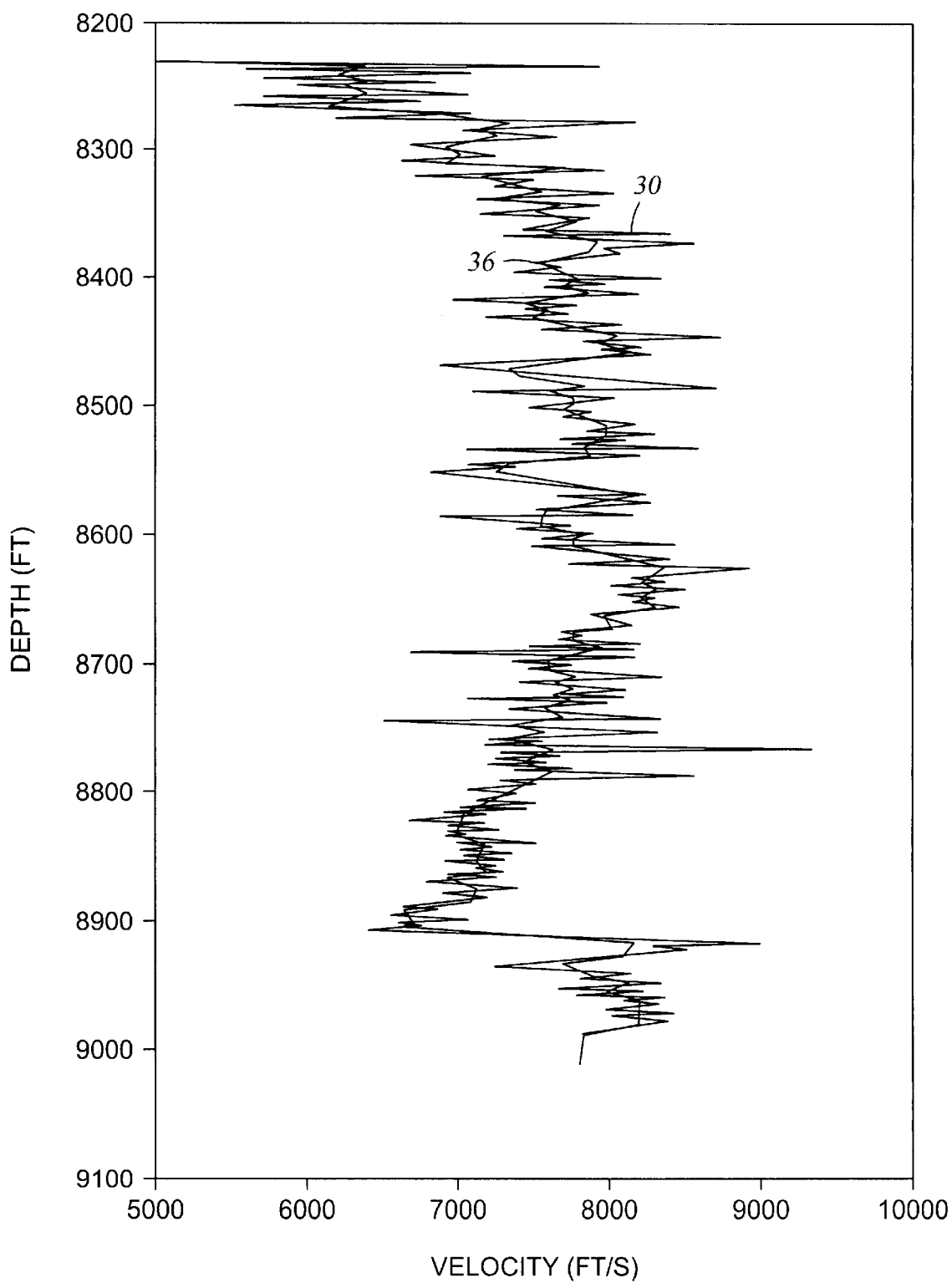
FIG. 5 shows an example of the second output of the invention, as applied to the compressional wave velocity log of FIG. 2.

FIG. 5 shows an example,designated by numeral 30, of the second output of the invention, as applied to the compressional wave velocity log shown in FIG. 2, overlaid on the compressional wave velocity log shown in FIG. 2, and designated by numeral 36. The presence of the thin beds, as they would appear to a seismic signal can now be seen. Many of the thin beds are effectively removed. Some of the thicker beds are merely reduced in importance but are still observable, but now the relative importance of the layering (to a seismic signal) is put on an equal basis.

In performing the invention, "thin-bed" effects are removed from the log (either the compressional wave velocity, sonic wave velocity, density, acoustic impedance or elastic impedance log, as the case may be) in such a way that abrupt velocity changes which are present in the subsurface are maintained in the log. The log does not suffer the amplitude distortion which results from the prior art method of simply applying a low pass filter to the log data. In the preferred embodiment of the invention described herein, only those samples which the seismic method could not detect are removed from the log data. The resulting processed log is much simpler than the original log, but jumps in the log data are preserved if the reflection from the jump is detectable by the seismic technique. Matching of the log to the seismic data is facilitated because strata which are meaningless to the seismic data are removed and log variations in different strata have been given the value that would be seen by the seismic signal.

It is important to recognize that an integrated log generated in accordance with this invention should not be used to build a synthetic seismic data or to calculate travel times; but merely as an interpretive tool to address the relative importance, from an amplitude-based point of view, of the interpretive significance of each layer. Note that there has been no loss of information in the integrated log other than that which the seismic data is unable to see. To the extent that a given bed is detectable, it is still represented.

Those of ordinary skill in the art will recognize that the steps of this invention will normally be implemented on a digital computer, and that computer instructions readable by a digital computer and defining the method of the invention will be stored on a storage medium such as magnetic tape, a magnetic or optical disk or an equivalent storage device and will instruct the computer to perform the method.

It will be appreciated that various modifications and variations may be made to the invention without departing from the scope of the invention as defined in the appended claims. It is the intent to cover within the scope of the appended claims all such modifications and variations.

I claim:

1. A method of processing well log data comprising:

evaluating said well log data to identify variations in said well log data which are indicative of thin beds of a selected thickness; and reducing the magnitude in said well log data of said identified variations by a magnitude related to said selected thickness.

2. The method of claim 1 wherein said well log data are compressional wave velocity data.

3. The method of claim 1 wherein said well log data are shear wave velocity data.

4. The method of claim 1 wherein said well log data are density data.

5. The method of claim 1 wherein said well log data are acoustic impedance data.

6. The method of claim 1 wherein said well log data are elastic impedance data.

7. A method of processing well log data comprising:

locating in a reflection coefficient series calculated from well log data consisting of one of the following types: compressional wave velocity log data, shear wave velocity data, density log data, acoustic impedance log data or elastic impedance log data, pairs of reflection coefficients of opposite polarity and spaced apart within the thickness range of a thin bed;

for each said pair of reflection coefficients, determining the magnitude of the reflection coefficient having the smaller magnitude and subtracting said smaller magnitude from the magnitude of each reflection coefficient of said pair, thereby developing a first modified reflection coefficient series;

for each said pair of reflection coefficients, multiplying said smaller magnitude by a factor which is related to the time spacing in said log data between said pair of reflection coefficients; and storing the resulting multiplied magnitude in a data storage array at a location corresponding to the locations of said pair of reflection coefficients, thereby developing a second modified reflection coefficient series;

summing said first modified reflection coefficient series and said second modified reflection coefficient series; and inverting said summed first and second coefficient series to generate modified well log data of the type from which said reflection coefficient series was calculated.

8. A method of processing well log data comprising:

generating an initial reflection coefficient series from well log data consisting of one of the following types: compressional wave velocity data, shear wave velocity data, density log data, acoustic impedance log data or elastic impedance log data;

determining in said initial reflection coefficient series pairs of reflection coefficients of opposite polarity and spaced apart within the thickness range of a thin bed;

attenuating both reflection coefficients of each said pair by a factor related to the spacing between said pair thereby generating a modified reflection coefficient series; and inverting said modified reflection coefficient series to generate a modified well log data of the type from which said initial reflection coefficient series was calculated.

9. A method of processing well log data comprising generating an initial reflection coefficient series from well log data consisting of one of the following types: compressional wave velocity data, shear wave velocity data, density log data, acoustic impedance log data or elastic impedance log data;

determining in said initial reflection coefficient series pairs of reflection coefficients of opposite polarity and spaced apart within the thickness range of a thin bed;

for each said pair of reflection coefficients, determining the magnitude of the reflection coefficient having the smaller magnitude and subtracting said smaller magnitude from the magnitude of each reflection coefficient of said pair, thereby developing a first modified reflection coefficient series;

for each said pair of reflection coefficients, multiplying said smaller magnitude by a factor which is related to the time spacing in said log data between said pair of reflection coefficients; and storing the resulting multiplied magnitude in a data storage array at a location corresponding to the locations of said pair of reflection coefficients, thereby developing a second modified reflection coefficient series;

inverting said first modified reflection coefficient series to generate first modified well log data of the type from which said reflection coefficient series was calculated;

summing said first modified reflection coefficient series and said second modified reflection coefficient series; and inverting said summed first and second coefficient series to generate second modified well log data of the type from which said reflection coefficient series was calculated.

10. A device adapted for use by a digital computer wherein a plurality of computer instructions readable by said digital computer are encoded, which instructions instruct the computer to perform a process comprising:

generating an initial reflection coefficient series from well log data consisting of one of the following types: compressional wave velocity data, shear wave velocity data, density log data, acoustic impedance log data or elastic impedance log data;

determining in said initial reflection coefficient series pairs of reflection coefficients of opposite polarity and spaced apart within the thickness range of a thin bed;

for each said pair of reflection coefficients, determining the magnitude of the reflection coefficient having the smaller magnitude and subtracting said smaller magnitude from the magnitude of each reflection coefficient of said pair, thereby developing a first modified reflection coefficient series;

for each said pair of reflection coefficients, multiplying said smaller magnitude by a factor which is related to the time spacing in said log data between said pair of reflection coefficients; and storing the resulting multiplied magnitude in a data storage array at a location corresponding to the locations of said pair of reflection coefficients, thereby developing a second modified reflection coefficient series;

inverting said first modified reflection coefficient series to generate first modified well log data of the type from which said reflection coefficient series was calculated;

summing said first modified reflection coefficient series and said second modified reflection coefficient series; and inverting said summed first and second coefficient series to generate second modified well log data of the type from which said reflection coefficient series was calculated.

11. The device of claim 10 wherein said device is selected from the group consisting of a magnetic tape, a magnetic disk, and an optical disk.

* * * * *